(12) United States Patent
Perlman

(10) Patent No.: US 8,315,395 B2
(45) Date of Patent: Nov. 20, 2012

(54) NEARLY-STATELESS KEY ESCROW SERVICE

(75) Inventor: Radia J. Perlman, Sammamish, WA (US)

(73) Assignee: Oracle America, Inc., Redwood Shores, CA (US)

( * ) Notice: Subject to any disclaimer, the term of this patent is extended or adjusted under 35 U.S.C. 154(b) by 535 days.

(21) Appl. No.: 12/331,848

(22) Filed: Dec. 10, 2008

(65) Prior Publication Data

US 2010/0142713 A1 Jun. 10, 2010

(51) Int. Cl.
*H04L 9/08* (2006.01)
*H04L 9/00* (2006.01)
*G06F 7/04* (2006.01)

(52) U.S. Cl. .............................. 380/286; 300/44; 726/26
(58) Field of Classification Search .................. None
See application file for complete search history.

(56) References Cited

U.S. PATENT DOCUMENTS

| | | | | |
|---|---|---|---|---|
| 5,963,646 | A  * | 10/1999 | Fielder et al. ............... | 380/259 |
| 6,212,635 | B1 * | 4/2001  | Reardon ....................... | 713/165 |
| 6,393,565 | B1 * | 5/2002  | Lockhart et al. ............. | 713/172 |
| 6,788,800 | B1 * | 9/2004  | Carr et al. .................... | 382/100 |
| 7,085,923 | B2 * | 8/2006  | Mraz ............................ | 713/156 |
| 7,337,322 | B2 * | 2/2008  | Gentry et al. ................ | 713/176 |
| 2002/0069252 | A1 * | 6/2002 | Jones et al. .................. | 709/206 |
| 2004/0068650 | A1 * | 4/2004 | Resnitzky et al. ........... | 713/155 |
| 2007/0199071 | A1 * | 8/2007 | Callas .......................... | 726/26 |

* cited by examiner

*Primary Examiner* — William Powers
(74) *Attorney, Agent, or Firm* — Park, Vaughan, Fleming & Dowler LLP; Laxman Sahasrabuddhe

(57) ABSTRACT

Some embodiments provide a system to generate a key pair. During operation, the system can receive a request to generate the key pair, wherein the key pair is generated by a key assigner, and wherein the key pair is associated with a user. Next, the system can determine a secret associated with the key assigner. Specifically, the system can determine the secret by determining an initial secret associated with the key assigner, and by applying a one-way hash function to the initial secret one or more times. The system can then determine a seed based on the secret. Specifically, the system can determine the seed by cryptographically combining the secret with information associated with the user. Next, the system can generate the key pair by using the seed as an input to a key generator. The system can then return the key pair to a requestor.

9 Claims, 5 Drawing Sheets

NEARLY-STATELESS KEY ESCROW SERVICE

BACKGROUND

1. Field

This disclosure generally relates to key management in data security systems. More specifically, this disclosure relates to techniques and systems for recovering a private key.

2. Related Art

Organizations commonly encrypt sensitive data to protect the data from unauthorized accesses. To access the encrypted data, it first needs to be decrypted using a key. However, if the key is unavailable for any reason, the encrypted data becomes useless. Hence, organizations often use a key escrow service to store keys so that the keys can be recovered if they are lost or damaged.

Specifically, in public-key cryptography, when the system generates a key pair, the system can store the key pair on a key escrow server. When the private key needs to be recovered, the system can retrieve the relevant private key from the database, using information associated with the key, e.g., the public key, the serial number, or the user ID, to find the relevant private key.

Unfortunately, conventional key escrow services suffer from serious drawbacks. First, conventional techniques are complex and can require large amounts of storage. Note that even after a user is assigned a new key pair, the system may still need to store the old private key because the user may have encrypted data using the old public key. Hence, in conventional techniques, the system may potentially need to store all of the keys that were ever generated. Further, the database that stores these keys may need to be backed up frequently because the database is highly volatile (it changes every time a key pair is generated).

Second, in conventional techniques, the key assignment system usually communicates with the key recovery system every time a key pair is generated. This increases the network resource requirements and makes the system vulnerable to attacks. Specifically, key assigners are often in geographically diverse locations, and keeping the key database synchronized while keeping it secure can be very challenging. For example, a malicious user may disrupt the system by bringing down the communication link between the assignment servers and the recovery servers. Further, if the key recovery system is reachable over a network, all users on the network may be able to attack the system.

Hence, it is generally desirable to be able to assign recoverable keys without the above-described drawbacks.

SUMMARY

Some embodiments of the present invention provide techniques and systems to generate recoverable keys. During operation, a system can receive a request to generate a key pair, wherein the key pair is generated by a key assigner, and wherein the key pair is associated with a user. Specifically, the system can receive a certificate which certifies that the key pair is associated with the user, and that the key pair was generated by the key assigner. Next, the system can determine a secret associated with the key assigner. The system can then determine a seed based on the secret. Next, the system can generate the key pair by providing the seed as an input to a key generator. The system can then return the key pair to a requestor.

In some embodiments, the system can determine the secret by cryptographically combining a master secret with a key-assigner identifier associated with the key assigner.

In some embodiments, the system can determine the secret by looking up the secret in a database which associates secrets with key assigners.

In some embodiments, the system can determine the secret by determining an initial secret associated with the key assigner, and by determining the secret by applying a one-way hash function one or more times to the initial secret.

In some embodiments, the system can determine the seed based on the secret by cryptographically combining the secret with information associated with the user. Further, in some embodiments, the system can use the secret as the seed, or the system can apply a one-way hash function to the secret one or more times to obtain a new secret, and use the new secret as the seed.

In some embodiments, prior to receiving the key-recovery request, the system can send the secret to the key assigner. The key assigner can then use the secret to generate the key pair. In a variation, the key assigner can determine a new secret by applying a one-way hash function to the secret one or more times. Next, the key assigner can delete the old secret, and use the new secret to generate the key pair. Note that since the new secret was determined using a one-way hash function, it is computationally impractical to determine the old secret from the new secret.

In some embodiments, the system can cryptographically combine the secret with information associated with the user by hashing the secret with the information. Specifically, the system can hash the secret with a user identifier associated with the user, the user certificate's serial number, and/or the user certificate's creation date.

DETAILED DESCRIPTION

Figure 1:
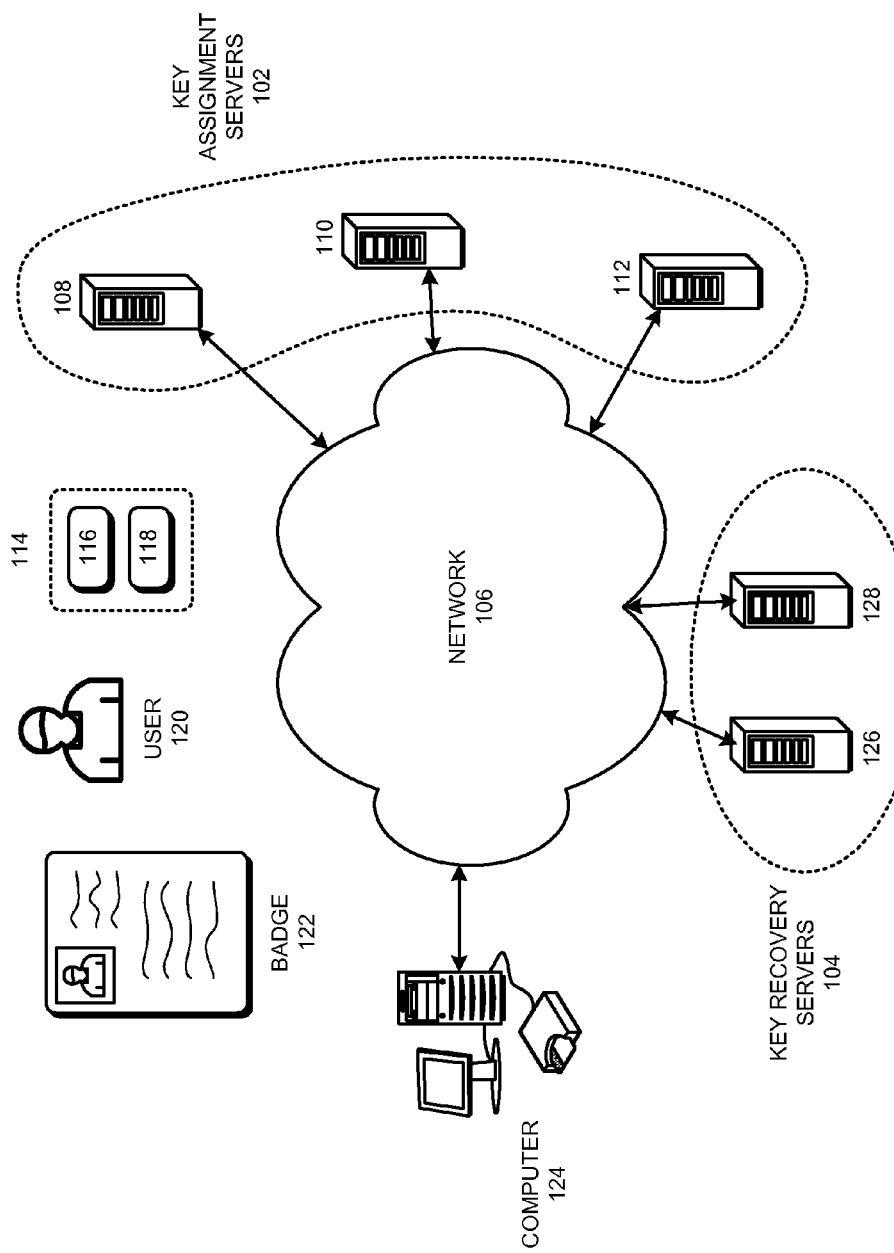
FIG. 1 illustrates how an enterprise can use public-key cryptography to protect sensitive data in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Public-Key Cryptography and Certificates

In public-key cryptography (also known as asymmetric cryptography), encryption and decryption is accomplished using a key pair: a private key and a public key. Specifically, a message encrypted using one of the keys can be decrypted using the other key. Note that, although the keys are mathematically related, it is computationally impractical to derive one key from the other. Hence, a user can widely distribute the public key without compromising the private key.

Public-key cryptography can be used to ensure confidentiality and authenticity. To ensure confidentiality, a user can encrypt a message using the recipient's public key, and the recipient can decrypt the message using the recipient's private key. To ensure authenticity, the user can digitally sign the message using the user's private key, and the recipient can verify the digital signature using the user's public key.

A certificate is a digitally signed document that certifies that a certain piece of information is true. The entity that issues the certificate is usually called a certificate authority (CA). For example, a CA can issue a certificate to certify that a key pair is associated with a particular user, that the key pair was generated on a particular date, and/or that the key pair was generated by a particular entity. Public key infrastructure (PKI) is a certification system that uses public-key cryptography to issue certificates.

Nearly-Stateless Key Escrow Service

FIG. 1 illustrates how an enterprise can use public-key cryptography to protect sensitive data in accordance with an embodiment of the present invention.

An enterprise can generate key pair 114 for user 120 to enable user 120 to encrypt and/or decrypt data. Specifically, key pair 114 can include private key 116 and public key 118.

A large enterprise may use multiple key assignment servers 102 to generate keys for its employees. For example, key assignment servers 108, 110, and 112 may generate keys for employees in different office locations and/or different groups within the enterprise.

One or more keys associated with user 120 can be stored on badge 122. Specifically, badge 122 can store private key 116 along with a certificate which provides information associated with private key 116. User 120 can use badge 122 to perform secure transactions. For example, user 120 can insert badge 122 in a card reader that is coupled with computer 124 to authenticate user 120 with computer 124. Next, computer 124 can use private key 116 stored on badge 122 to enable user 120 to decrypt and/or sign data.

If badge 122 is damaged, lost, or stolen, it can lead to serious problems because data that was encrypted using the associated key pair may become unusable. Specifically, if user 120 encrypts important data (e.g., a password or a symmetric key) using public key 118, the data can only be decrypted using private key 116 which is stored on badge 122. If badge 122 is damaged so that private key 116 can no longer be accessed, it will cause the data to become unusable. Hence, techniques and systems to recover keys are usually an important component of any data security system.

Conventional techniques for recovering keys typically use a key escrow service to store private keys so that the private keys can be recovered when needed. Unfortunately, as explained above, conventional techniques are complex, require large amounts of resources, require network communication or stable storage at the key assigner, and make the system vulnerable to attacks.

In contrast to conventional techniques, some embodiments of the present invention provide a much simpler key recovery system which requires fewer resources and which is more robust.

Some embodiments of the present invention may use one or more key recovery servers 104 to recover private keys. Specifically, key recovery servers 126 and 128 may be used to recover keys in different offices and/or different groups within an enterprise.

Key recovery servers 104 may communicate with key assignment servers 102 via network 106. Network 106 can generally include any type of wired or wireless communication channel capable of coupling together computing nodes. This includes, but is not limited to, a local area network, a wide area network, or a combination of networks. In one embodiment of the present invention, network 106 includes the Internet.

Some embodiments of the present invention include key assignment servers that do not communicate with a key recovery server, and yet the key recovery server can recover keys assigned by any of the key assignment servers. Specifically, other than communicating an initial secret to each one of the key assignment servers, a key assignment server does not need to communicate with the key recovery server, or keep any record of keys that the key assignment server has assigned, and yet the key recovery server is able to recover any keys assigned by any of the key assignment servers.

Further, compromise of the secrets on a key assignment server may not compromise, nor require reassignment of, keys assigned by any other key assignment server. Specifically, in some embodiments, compromise of a key assignment server only compromises keys assigned by that key assignment server after the compromise. In other words, keys assigned by that key assignment server prior to the compromise are still secure, and need not be revoked.

Specifically, in one embodiment, key recovery server 126 can obtain a master secret S. Specifically, master secret S can be a random number. Next, key recovery server 126 can use S to generate a secret for each key assignment server. In particular, key recovery server 126 can generate a secret for a key assignment server by hashing S with the name of the key assignment server and optionally with the date the secret was given to the key assignment server. Note that, instead of using the date, the system can also use a monotonically increasing serial number.

Note that, given a key assignment server's secret, it is impossible to derive either the key recovery server's master secret, or the secret of any other key assignment server. Each key assignment server can periodically (e.g., once per day, once per week, or every time a key is assigned) hash the secret it knows with a one-way hash function to generate a new secret, and delete the old secret. For example, suppose key recovery server 126 provides secret K to key assignment server 108 on a particular day, say Jun. 16, 2009. Key assignment server 108 can generate a new secret every day by applying a one-way hash function to the current secret. For example, the key assignment server can generate secret h(K) on June 17, secret h(h(K)) on June 18, and so on. Note that since h is a one-way hash function, it is computationally impractical to determine K from h(K). Hence, if the key assignment server's secret is compromised on a particular day, the secrets that the key assignment server used on previous days will still be secure.

To generate a key pair for a user, a key assignment server can hash a unique identifier associated with the user with the current secret, and use the resulting value as a seed in a key generator. Examples of unique identifiers include, but are not limited to, the user's name, email address, and badge number.

For example, to generate a key pair for a user on June 18, the key assignment server can hash the secret it knows, i.e., h(h(K)), with a user identifier associated with the user, and use the result as a seed in a pseudorandom number generator to generate a public key pair for the user. Note that the key assigner's identity, the date on which the key pair was generated, and the user identifier can be included in a certificate. Specifically, the key assignment server can provide the relevant information to a CA, and the CA can create a certificate.

If the user loses the private key, the key recovery server can recover it using the following steps. First, the key recovery server can determine which key assignment server generated the private key. This information may be contained in the certificate, or it can be based on knowledge of the building in which the user obtained the private key. Alternatively, the user can be asked to provide this information. If this information is missing, all the possible key assignment server names could be used in a brute-force approach to find the key assignment server name that would have generated the public key in the user's certificate.

Next, the key recovery server can determine the day on which the key assignment server generated the user's private key. The date may be included in the certificate. If the key assignment server is using a one-way hash to periodically change its secret, the date can be used to determine how many times the hash function should be applied to obtain the secret that was used to generate the user's private key. In some embodiments, the certificate can include a serial number (instead of a date) which can indicate how many times the one-way hash function should be applied.

If no information is available to determine how many times the one-way hash function should be applied, the system can use a brute-force approach to recover the private key. For example, the system can determine a set of secrets by applying the one-way hash function to the initial secret different numbers of times, and use the set of secrets to determine the secret that would have generated the public key in the user's certificate. Specifically, the system can generate a key pair for each secret in the set of secrets, and match the public key in each key pair with the public key in the certificate. Once the system finds a match, the system can use the private key that corresponds to the matched public key. In some embodiments, the system can apply a one-way hash function multiple times by using systems and techniques described in patent application Ser. No. 12/118,893, entitled "Fast Computation of One-Way Hash Sequences" by inventor Radia J. Perlman filed on 12 May 2008, which is hereby incorporated by reference.

Note that some of these steps can be omitted if more databases are kept. For example, if the secret associated with each key assignment server is stored in a database along with the date it was given to the key assignment server, the initial secret that is provided to the key assignment server can be an independently generated random number. However, when the initial secret is derived from master secret S and the name of the key assignment server, the key recovery server does not need to know anything other than S, e.g., the key recovery server need not know who the key assignment servers are, or when they were deployed.

To revoke a user's key, the system can revoke the associated certificate by using any traditional PKI revocation mechanism, such as certificate revocation lists (CRLs) or online certificate status protocol (OCSP). The user can then be issued a new private key accompanied by a new certificate. Note that, even though the user identifier is the same as it was with the revoked key, the new certificate is issued on a different day. Hence, the key generation process can use the certificate timestamp to ensure that the new key is different from the revoked key.

If a key assignment server that uses a one-way hash function is compromised, the keys that were generated using earlier secrets are not compromised because it is computationally impractical to determine the pre-image of a hash value. The compromised keys will need to be revoked and reassigned, and the key assignment server will need to change its name or change a key version number, so that the new seed that the key assignment server is given is not derivable from the stolen secrets.

The foregoing descriptions have been presented only for purposes of illustration and description, and are not intended to be exhaustive or to limit the present invention to the forms disclosed. Accordingly, many modifications and variations will be apparent to practitioners skilled in the art. For example, the seed from which a user's key is derived can be a cryptographic hash of the key assignment server's secret, a user identifier, and a key version number which can also be stored in the certificate.

Based on the above discussion, the following sections describe techniques and systems for determining a secret, for generating a key pair, and for recovering a private key.

Generating a Secret

Figure 2:
FIG. 2 presents a flowchart that illustrates a process for generating a secret for a key assigner in accordance with an embodiment of the present invention.

FIG. 2 presents a flowchart that illustrates a process for generating a secret for a key assigner in accordance with an embodiment of the present invention.

The process can begin by determining a secret by cryptographically combining a master secret with a key-assigner identifier associated with a key assigner (step 202). A key assigner can generally be any system that generates keys for users. For example, a key assignment server can be a key assigner.

Next, the system can send the secret to the key assigner (step 204). Specifically, the secret can be sent to the key assigner over a network. Alternatively, the secret can be sent to the key assigner by using a removable storage medium. For example, the secret can be stored on a flash drive, and the key assigner can then read the secret from the flash drive.

Generating a Key Pair

Figure 3A:
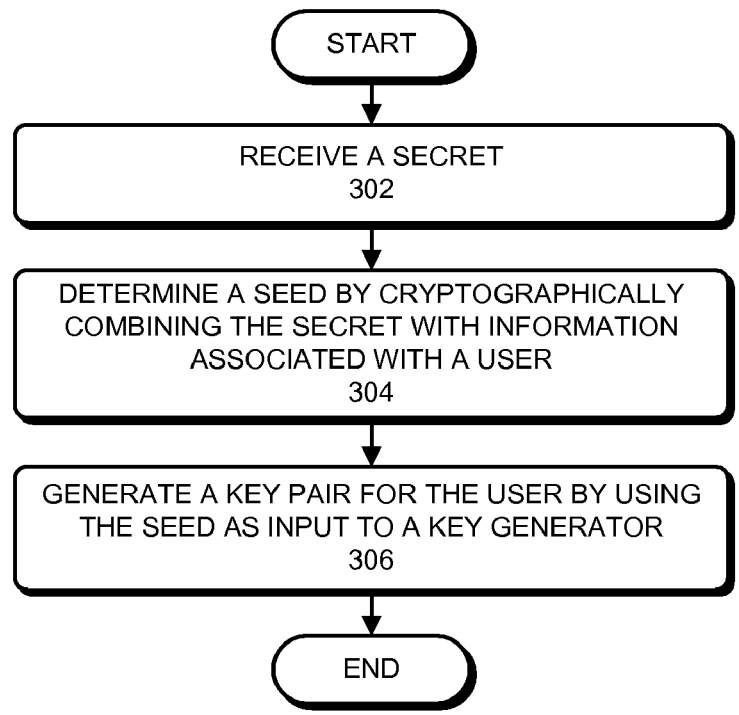
FIG. 3A presents a flowchart that illustrates a process for generating a key pair for a user in accordance with an embodiment of the present invention.

FIG. 3A presents a flowchart that illustrates a process for generating a key pair for a user in accordance with an embodiment of the present invention.

The process can begin by receiving a secret (step 302). Specifically, a key assignment server can receive the secret from a key recovery server.

Next, the system can determine a seed based on the secret. Specifically, the system can determine a seed by cryptographically combining the secret with information associated with a user (step 304). Note that it is computationally impractical to determine the secret from the seed. Specifically, the system can use a cryptographic hash function which takes the secret and the user identifier as input, and which generates the seed as output. Instead of, or in addition to, the user identifier, the seed for the user's key pair can be created by cryptographically combining the secret with any of the information in the certificate, such as the certificate serial number, the creation date, or a random number stored in the certificate. Further, in some embodiments, the system can directly use the secret as the seed, or the system can apply a one-way hash function to the secret one or more times to obtain a new secret, and then use the new secret as the seed.

The system can then generate a key pair for the user by using the seed as input to a key generator (step 306). Specifically, the system can use the seed as an input for a pseudorandom number generator to generate a private key and a public key for the user.

Figure 3B:
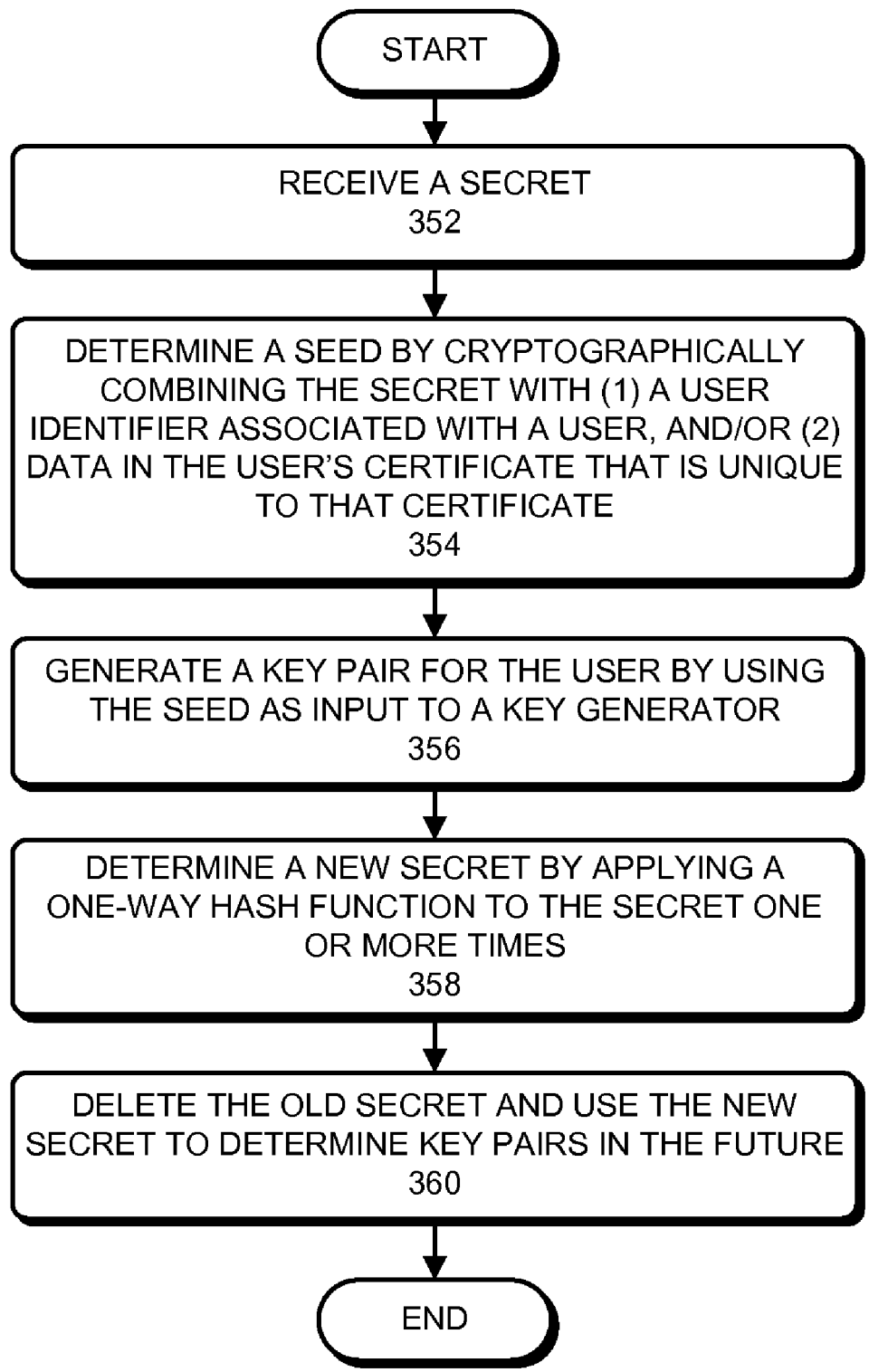
FIG. 3B presents a flowchart that illustrates a process for generating a key pair by using data that is unique to the certificate and by periodically generating new secrets in accordance with an embodiment of the present invention.

Many modifications and variations of the process shown in FIG. 3A are possible. Specifically, FIG. 3B presents a flowchart that illustrates a process for generating a key pair by using data that is unique to the certificate and by periodically generating new secrets in accordance with an embodiment of the present invention.

As before, the process can begin by receiving a secret (step 352). Next, the system can determine a seed by cryptographically combining the secret with (1) a user identifier associated with a user, and/or (2) data in the user's certificate that is unique to that certificate (step 354).

For example, the system can determine a seed by cryptographically combining the secret with the user identifier and the certificate's timestamp. Note that, by using data that is unique to the certificate, the system can ensure that a revoked key won't be regenerated for the same user.

The system can then generate the key pair for the user by using the seed as input to a key generator (step 356). Next, the system can determine a new secret by applying a one-way hash function to the secret one or more times (step 358). If the system generates a new secret each time it generates a key pair, the system may not need to use data that is unique to the certificate to ensure that a revoked key won't be regenerated for the same user.

Once the system generates the new secret, the system can delete the old secret and use the new secret to determine key pairs in the future (step 360). If the system is compromised and the new secret is stolen, the keys that were generated using the old secret are still secure because it is computationally impractical to determine the old secret from the new secret.

Recovering a Private Key

Figure 4:
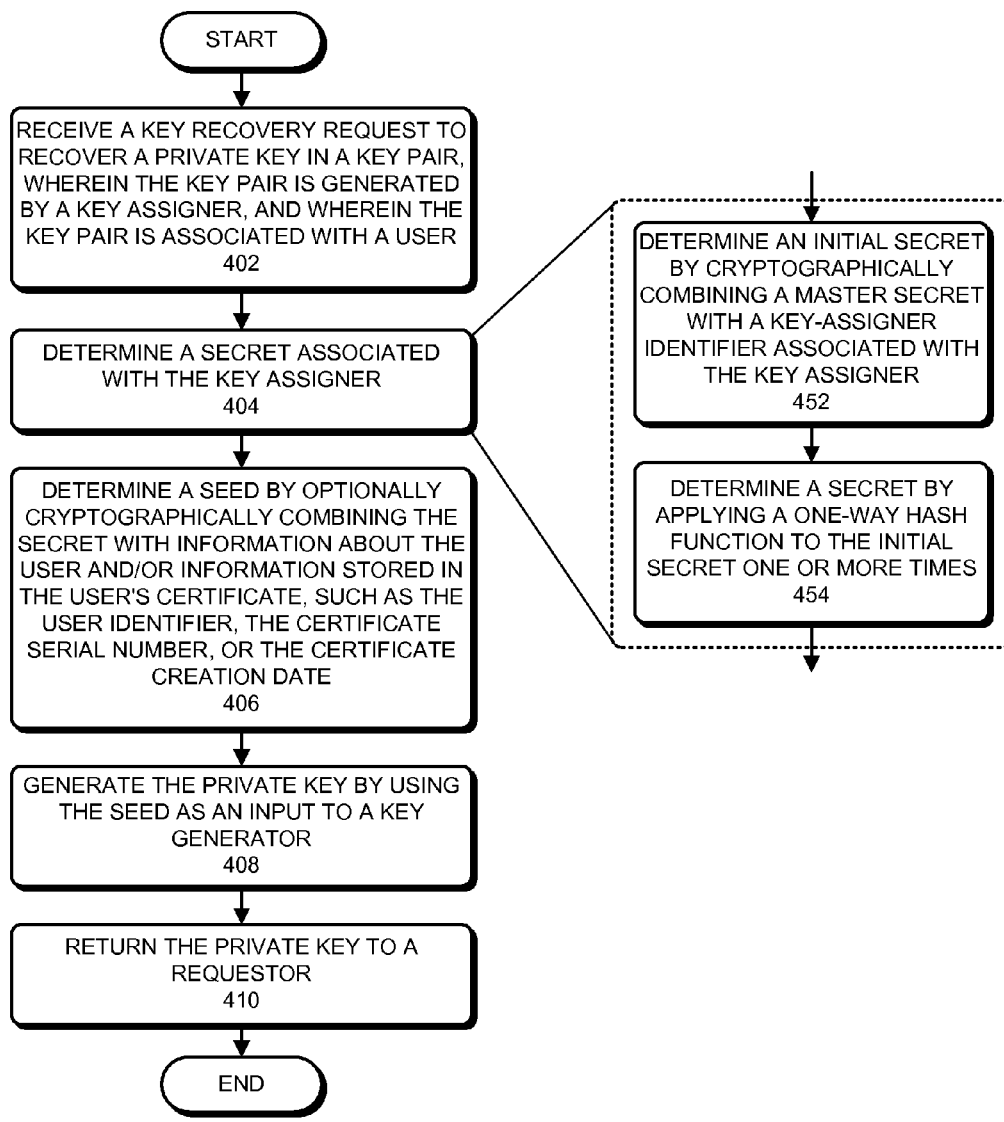
FIG. 4 presents a flowchart that illustrates a process for recovering a private key in accordance with an embodiment of the present invention.

FIG. 4 presents a flowchart that illustrates a process for recovering a private key in accordance with an embodiment of the present invention.

The process can begin by receiving a key recovery request to recover a private key in a key pair, wherein the key pair is generated by a key assigner, and wherein the key pair is associated with a user (step 402).

Next, the system can determine a secret associated with the key assigner (step 404). The system can use many techniques for determining the secret associated with the key assigner. For example, the system can determine an initial secret by cryptographically combining a master secret with a key-assigner identifier associated with the key assigner (step 452). Next, the system can determine the secret by applying a one-way hash function to the initial secret one or more times (step 454).

Alternatively, the system can determine the secret associated with the key assigner by looking up the secret in a database which associates secrets with key assigners.

Information about the key assigner and the user can be stored in the certificate associated with the user's public key. Specifically, the key-assigner identifier and the user identifier can be stored in the certificate. Alternatively, this information can be determined from other sources. If the key assigner uses a one-way hash to generate new secrets, the certificate can also include information which indicates how many times the one-way hash is to be applied. For example, the certificate can include a date and/or a serial number.

The system can then determine a seed by optionally cryptographically combining the secret with information about the user and/or information stored in the user's certificate, such as the user identifier, the certificate serial number, or the certificate creation date (step 406). Specifically, in some embodiments, the system can cryptographically combine the secret with information associated with the user by hashing the secret with the information associated with the user. Further, in some embodiments, the system does not combine the secret with information associated with the user. Instead, the system either uses the secret as the seed, or it first applies a one-way hash function to the secret one or more times to obtain a new secret, and then uses the new secret as the seed.

Next, the system can generate the private key by using the seed as an input to a key generator (step 408). Specifically, the seed can be used in a pseudorandom number generator to determine the key pair. The system can then return the private key to a requestor (step 410).

Figure 5:
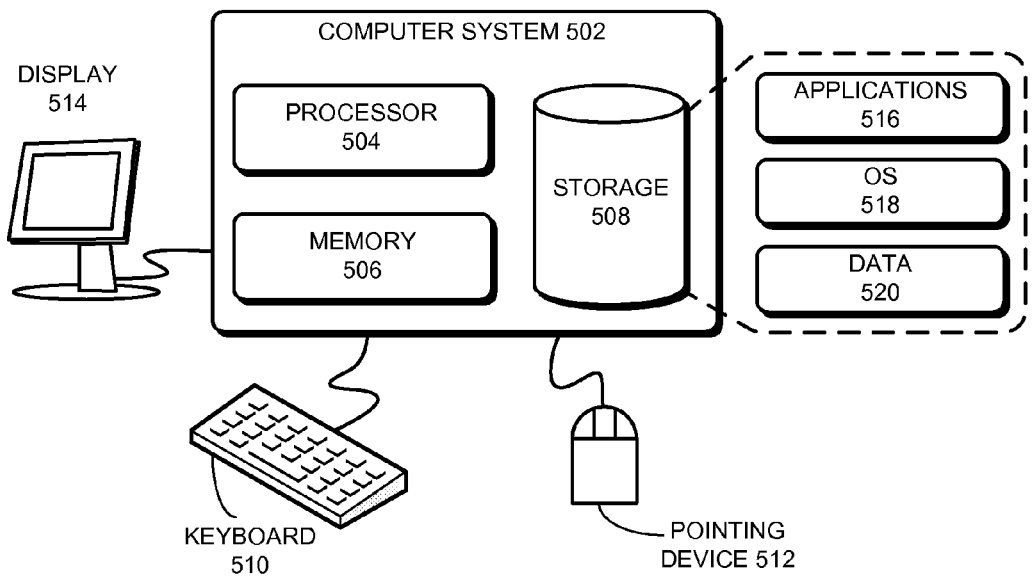
FIG. 5 illustrates a computer system in accordance with an embodiment of the present invention.

FIG. 5 illustrates a computer system in accordance with an embodiment of the present invention.

A computer system can generally be any device that can perform computations on data. Specifically, a computer system can be a microprocessor-based computer, a mainframe computer, a digital signal processor, a portable computing device, a personal organizer, a device controller, or a computational engine within an appliance. Computer system 502 comprises processor 504, memory 506, and storage 508. Computer system 502 can be coupled with display 514, keyboard 510, and pointing device 512.

A storage device can generally be any device that can store data. Specifically, a storage device can be a magnetic, an optical, or a magneto-optical storage device, or it can be based on flash memory and/or battery-backed up memory. Storage 508 can store applications 516, operating system 518, and data 520.

Applications 516 and/or operating system 518 can perform processes for determining a secret, for generating a key pair, and for recovering a key pair and/or a private key in a key pair. Data 520 can include secrets, seeds, keys, certificates, and any other information that may be required for generating or recovering keys.

Figure 6:
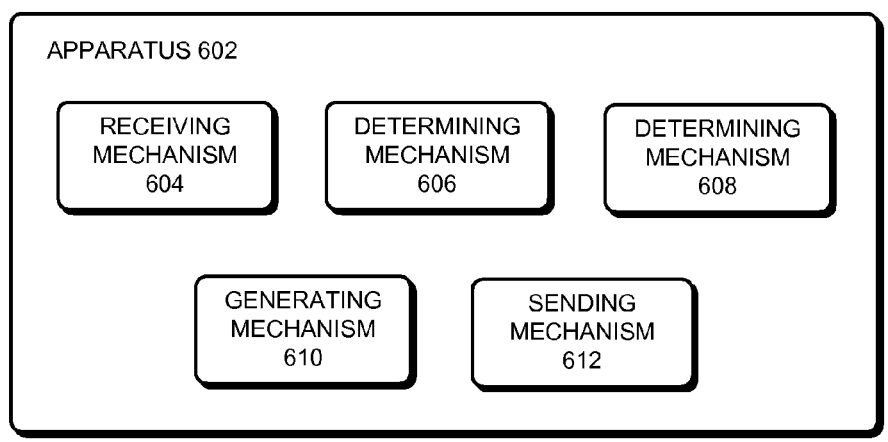
FIG. 6 illustrates an apparatus to generate and/or recover keys in accordance with an embodiment of the present invention.

FIG. 6 illustrates an apparatus to generate and/or recover keys in accordance with an embodiment of the present invention.

Apparatus 602 can comprise a number of mechanisms which may communicate with one another via a wire or wireless communication channel. Apparatus 602 may be realized using one or more integrated circuits, and it may be integrated in a computer system, or it may be realized as a separate device which is capable of communicating with other computer systems and/or devices. Specifically, apparatus 602 can comprise receiving mechanism 604, determining mechanism 606, determining mechanism 608, generating mechanism 610, and sending mechanism 612.

In some embodiments, determining mechanism 606 can be configured to determine a secret for a key assigner, and sending mechanism 612 can be configured to send the secret to the key assigner. Receiving mechanism 604 can be configured to receive a secret, determining mechanism 608 can be configured to determine a seed by cryptographically combining the secret with information associated with a user, and generating mechanism 610 can be configured to generate a key pair for the user by using the seed as input. In some embodiments, receiving mechanism 604 can be configured to receive a key recovery request, determining mechanism 606 can be configured to determine a secret associated with a key assigner, determining mechanism 608 can be configured to determine a seed by cryptographically combining the secret with information associated with a user, and generating mechanism 610 can be configured to generate a key pair for the user by using the seed as input.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating a key pair, the method comprising:
    in a key assignment server,
        receiving a request to generate a key pair associated with a user, wherein the key pair is generated by the key assignment server;
        acquiring, from a key recovery server, a secret associated with the key assignment server, wherein the key recovery server generates the secret associated with the key assignment server, and wherein generating the secret at the key recovery server comprises cryptographically combining a master secret with an identifier that identifies the key assignment server;
        determining a seed based on the secret, wherein determining the seed based on the secret includes cryptographically combining the secret received from the key recovery server with information associated with the user;
        generating the key pair by using the seed as an input to a key generator; and
        returning the key pair to a requestor.

2. The method of claim 1, wherein generating the secret in the key recovery server includes:
    determining an initial secret associated with the key assignment server; and
    determining the secret by applying a one-way hash function one or more times to the initial secret.

3. The method of claim 1, wherein the method further comprises receiving a certificate which certifies that the key pair is associated with the user, and that the key pair was generated by the key assignment server.

4. The method of claim 1, wherein the identifier that identifies the key assignment server is different from the information associated with the user.

5. A non-transitory computer-readable storage medium storing instructions that when executed by a computer cause the computer to perform a method for generating a key pair, the method comprising:
    in a key assignment server,
        receiving a request to generate a key pair associated with a user, wherein the key pair is generated by the key assignment server;
        acquiring, from a key recovery server, a secret associated with the key assignment server, wherein the key recovery server generates the secret associated with the key assignment server, and wherein generating the secret at the key recovery server comprises cryptographically combining a master secret with an identifier that identifies the key assignment server;
        determining a seed based on the secret, wherein determining the seed based on the secret includes cryptographically combining the secret received from the key recovery server with information associated with the user;
        generating the key pair by using the seed as an input to a key generator; and
        returning the key pair to a requestor.

6. The non-transitory computer-readable storage medium of claim 5, wherein generating the secret in the key recovery server includes:
    determining an initial secret associated with the key assignment server; and
    determining the secret by applying a one-way hash function one or more times to the initial secret.

7. The non-transitory computer-readable storage medium of claim 5, wherein the method further comprises receiving a certificate which certifies that the key pair is associated with the user, and that the key pair was generated by the key assignment server.

8. An apparatus that generates a key pair, the apparatus comprising:
    a key assignment server;
    a key recovery server coupled to the key assignment server;
    a receiving mechanism in the key assignment server configured to receive a request to generate a key pair associated with a user, wherein the key pair is generated by the key assignment server;
    wherein the receiving mechanism is further configured to receive, from a key recovery server, a secret associated with the key assignment server, wherein the key recovery server generates the secret associated with the key assignment server, and wherein generating the secret at the key recovery server comprises cryptographically combining a master secret with an identifier that identifies the key assignment server;
    a determining mechanism in the key assignment server configured to determine a seed based on the secret, wherein determining the seed based on the secret includes cryptographically combining the secret received from the key recovery server with information associated with the user;
    a generating mechanism in the key assignment server configured to generate the key pair by using the seed as an input to a key generator; and
    a returning mechanism in the key assignment server configured to return the key pair to a requestor.

9. The apparatus of claim 8, wherein, when generating the secret associated with the key assignment server, the key recovery server is configured to:

determine an initial secret associated with the key assignment server; and determine the secret by applying a one-way hash function one or more times to the initial secret.

* * * * *